J. KILBURN, J. W. FAIRLEY, T. B. KIDNER, W. H. IRVINE & W. T. CHESTNUT.
ACETYLENE GENERATOR.
APPLICATION FILED JULY 6, 1911.
1,029,999.
Patented June 18, 1912.
3 SHEETS—SHEET 1.
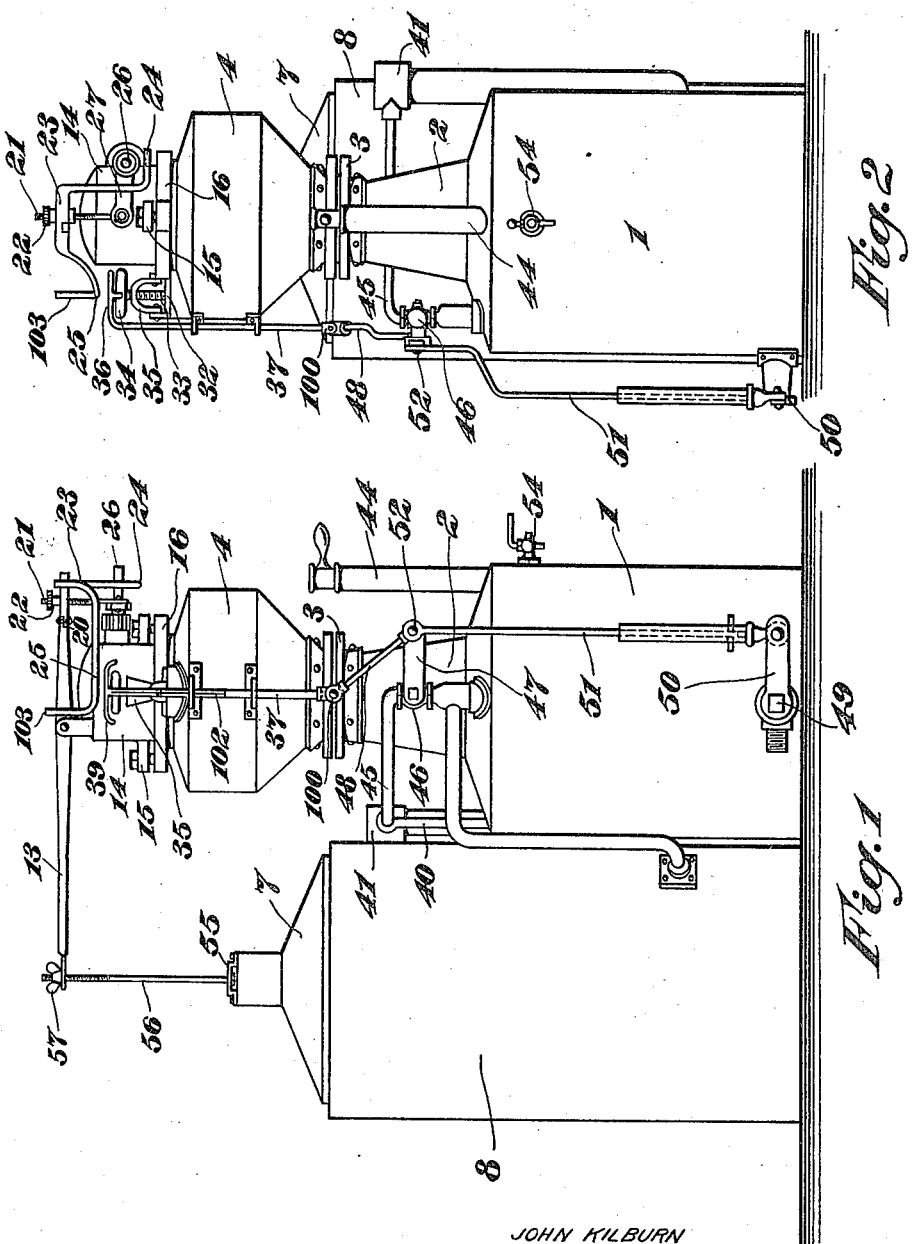
JOHN KILBURN
JOHN WESLEY FAIRLEY
THOMAS BESSELL KIDNER
WILLIAM HERBERT IRVINE
WILLIAM TURNBULL CHESTNUT Inventors
Witnesses:
By
Attorneys

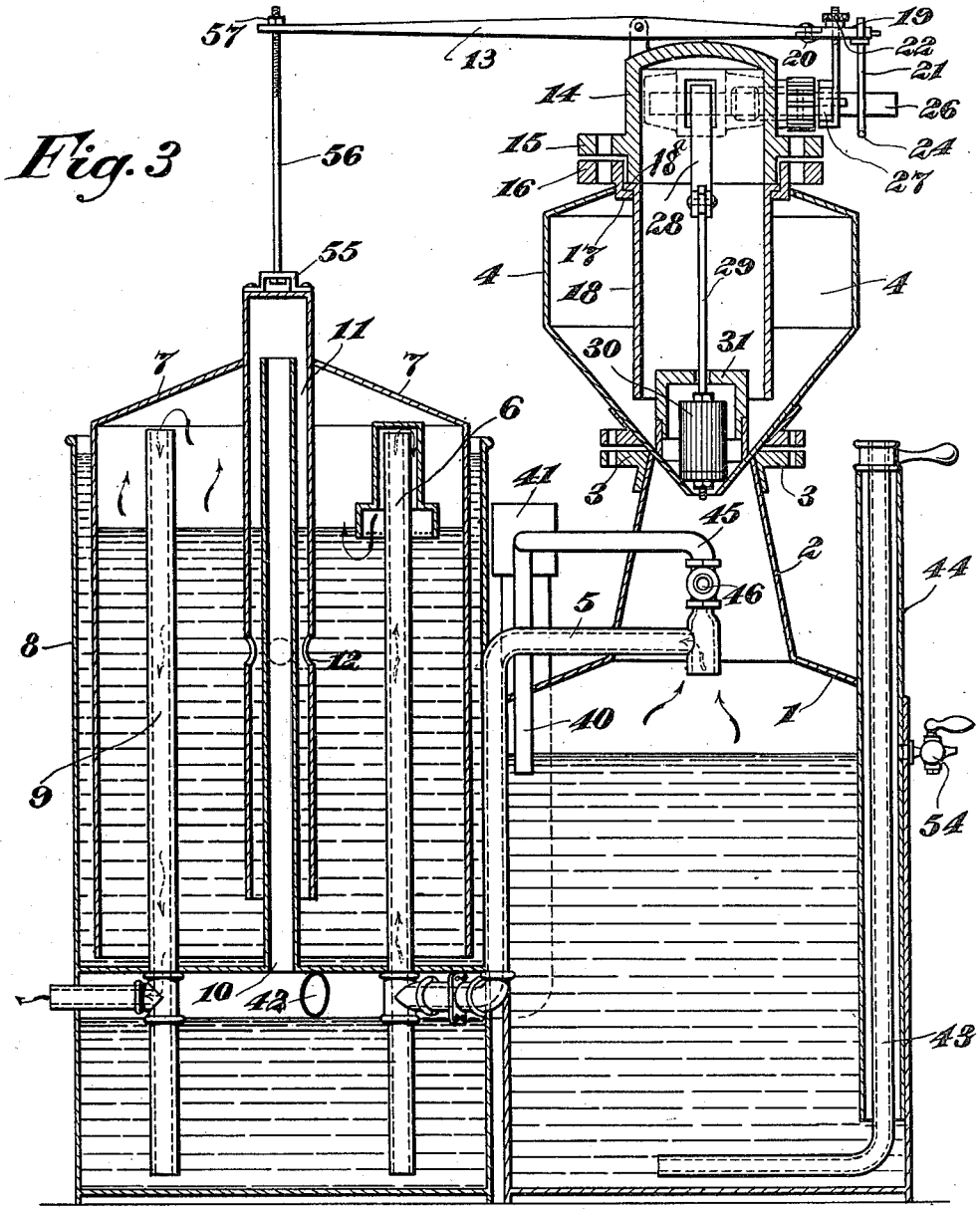

J. KILBURN, J. W. FAIRLEY, T. B. KIDNER, W. H. IRVINE & W. T. CHESTNUT.
ACETYLENE GENERATOR.
APPLICATION FILED JULY 6, 1911.
1,029,999.
Patented June 18, 1912.
3 SHEETS—SHEET 3.
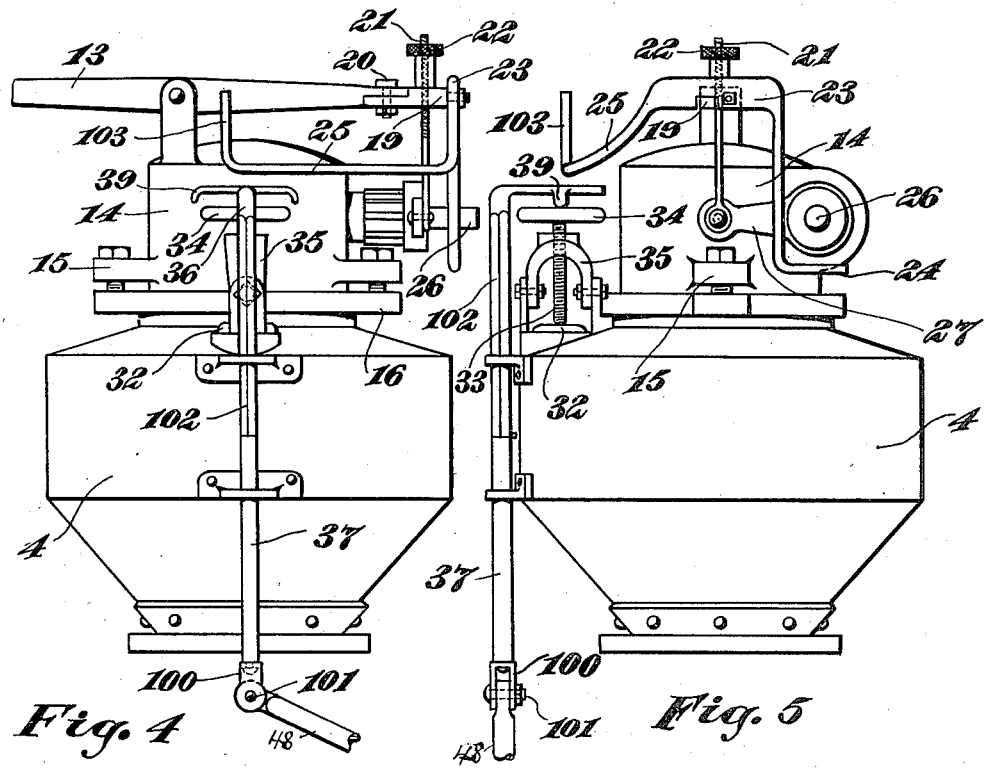
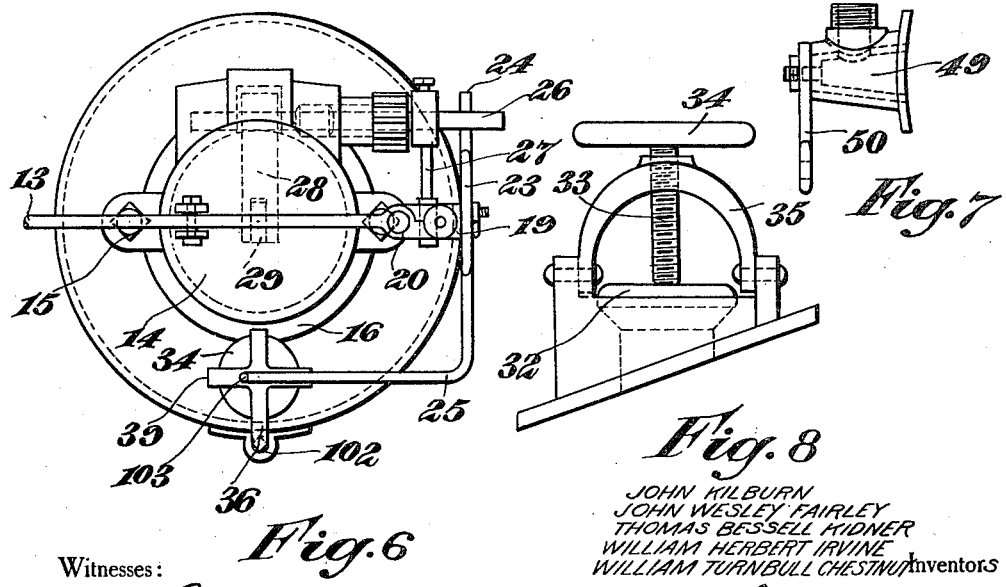
JOHN KILBURN
JOHN WESLEY FAIRLEY
THOMAS BESSELL KIDNER
WILLIAM HERBERT IRVINE
WILLIAM TURNBULL CHESTNUT Inventors

UNITED STATES PATENT OFFICE.

JOHN KILBURN, JOHN WESLEY FAIRLEY, THOMAS BESSELL KIDNER, WILLIAM HERBERT IRVINE, AND WILLIAM TURNBULL CHESTNUT, OF FREDERICTON, NEW BRUNSWICK, CANADA, ASSIGNORS TO MONITOR GAS GENERATOR COMPANY, OF NEW YORK, N. Y., A CORPORATION OF NEW YORK.

ACETYLENE-GENERATOR.

1,029,999.  Specification of Letters Patent.  Patented June 18, 1912.

Original application filed February 8, 1911, Serial No. 607,708. Divided and this application filed July 6, 1911. Serial No. 637,098.

*To all whom it may concern:*

Be it known that we, JOHN KILBURN, JOHN WESLEY FAIRLEY, THOMAS BESSELL KIDNER, WILLIAM HERBERT IRVINE, and WILLIAM TURNBULL CHESTNUT, all subjects of the King of Great Britain, and residing at the city of Fredericton, in the Province of New Brunswick, Canada, have invented certain new and useful Improvements in Acetylene-Generators; and we do hereby declare that the following is a full, clear, and exact description of the invention, such as will enable others skilled in the art to which it appertains to make and use the same.

The invention to be hereinafter described relates to gas generators and particularly to acetylene gas generators of the inverted bell variety.

This application is for an improvement on the subject matter of our application Serial Number 607,708, filed February 8th, 1911.

We do not claim in this application the subject matter of any claim in the application above mentioned or in our application 637,097, filed July 6th, 1911.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side elevation of the generator, complete; Fig. 2 is a left hand end view of Fig. 1; Fig. 3 is a vertical longitudinal section of the complete generator; Fig. 4 is an enlarged side elevation of the carbid chamber and attachments, as shown in Fig. 1; Fig. 5 is a view similar to Fig. 4, looking toward the left of Fig. 1; Fig. 6 is a top plan view of Fig. 4; Fig. 7 is a plan view of the drain cock, removed; and Fig. 8 is a front view of the closure retaining device.

Referring to the drawings in detail, 1 indicates a gas generating tank provided with an upwardly extending neck 2 adapted to loosely receive a removable cast iron collar having an annular perforated supporting flange 3. Upon flange 3 rests a similar and coöperating flange of a corresponding collar similarly fitted about and supporting the lower end of a removable carbid receptacle 4 of usual and well known form. The two annular flanges may be readily and solidly connected by bolts or the like, as will be evident. If desired, the collars may be soldered or otherwise solidly secured to the neck 2 and the carbid receptacle 4. The upper part of this generating tank is connected by an elbow pipe 5 with a vertical gas delivery pipe 6 which is adapted to deliver the gas to the interior of a bell 7 slidably mounted in the gas tank 8. Gas may be drawn from the gas tank through the pipe 9, in the usual manner. Centrally arranged within the chamber 8 is a hollow guide tube or pipe 10 adapted to fit loosely within a similar tube 11 extending downwardly from the top of the bell. The tube 11 is provided with a plurality of perforations 12 arranged at a predetermined point below the top of the bell. When the gas beneath the bell forces it upward to such a point that the perforations 12 are above the surface of the water, the excess gas will escape through the perforations and out through the tube 10 to the lower compartment of the tank 8 and thence through an opening 42 by a pipe to the flue 41, and thence by a suitable vent pipe to the outside of the building in which the generator is placed. In this way, the gas bell cannot be raised, by the gas, beyond a predetermined point.

In order to cut off the generation of gas at the proper time, it is necessary to stop the feed of carbid to the generating tank. For this purpose, an operating lever 13 (Figs. 1 and 3) has been provided. The long end of this lever is adjustably connected to an easily fusible strap 55 on the top of bell 7 by means of a threaded rod 56 and coöperating nut 57, which may be a winged thumb nut as shown in Fig. 1 or a slightly modified form as shown in Fig. 3. This lever is fulcrumed on the top of a cup shaped cap 14 provided with an annular, perforated, supporting flange 15, adapted to rest upon and coöperate with a similar flange 16 formed on and extending from a flanged ring 17 which is removably seated in a circular opening in the top of the carbid receptacle 4. In addition to said flange 15 the said flanged ring 17 consists of an inner thinner annular part or flange on a lower horizontal plane and a vertical part connecting these two flanges, all three parts being integral. A depending guard tube 18 is provided on the exterior of its upper end with an integral annular flange 18$^a$ which rests detachably on said inner horizontal flange of said ring. Said guard tube extends downward within the central part of the carbid receptacle nearly to the bottom of the latter as shown in Fig. 3. The flanges 15 and 16 are bolted together securely through detachably fastening said cap to said flange ring. The short end of lever 13 is bifurcated and longitudinally slotted. One arm 19 of the bifurcated end of the lever is pivoted to the lever at 20, to swing laterally therefrom. A threaded rod 21 projects through the slot of the lever 13 and is provided with an adjusting nut 22 screwed down thereon. Normally, the arm 19 is held in operative position by means of a rockable yoke 23 provided with off set arms 24 and 25 and pivotally mounted on the end of the stationary arm of the lever 13. The yoke is provided with a notch or recess adapted to receive or seat the end of the movable arm 19 and hold it parallel with the fixed arm of the lever, thereby supporting the nut 22. The off set arm 24 underlies a horizontal rock shaft 26 revolubly journaled in a suitable bearing formed as a part of one side of the cap 14. This shaft is provided with an outer arm 27 detachably connected thereto, and an inner arm 28 which projects downwardly within the guard tube 18. The outer arm is pivotally connected to the lower end of the rod 21 and the inner arm is pivotally connected to the upper end of a valve rod 29 on the lower end of which is fixed a plug valve 30, preferably rubber faced, adapted to close the discharge or delivery opening for delivering carbid to the interior of the generating tank. Slidably mounted on the valve rod 29, above the plug valve 30, is a cup shaped valve 31 adapted to seat itself, by gravity, slightly in advance of the plug valve 30 and to remain seated a short while after the plug valve has been lifted. The result of this construction is, that as soon as the bell 7 falls below a predetermined point, the short bifurcated end of the lever 13 will be raised, carrying with it the rod 21 and thus raising the valves 30 and 31 to permit carbid to drop from the receptacle 4 to the generating tank 1. The bell then rises as a result of the gas just generated. In this way, the quantity or supply of gas generated is kept fairly constant. Should an excess quantity be suddenly generated, the bell will rise until the excess may escape through the perforations 12 and pipe 10 into the lower compartment of the gas tank.

Should the supply of carbid in the receptacle 4 become exhausted and all the gas in the bell 7 be used, it is advisable, of course, to close the delivery opening of the carbid receptacle by seating the valves. This is effected automatically by engagement of the offset arm 24 with the rock shaft 26, as the short end of lever 13 rises, due to the drop of the bell 7. As soon as the off set arm 24 engages the rock shaft 26, the yoke 23 will be rocked on its pivot and the arm 19 will be freed, moving easily out to inoperative position, thus breaking connection between rod 21 and lever 13 and allowing the lever end to rise while the rod drops. Valves 30 and 31, of course, seat themselves by gravity, as soon as the connection is thus broken. Consequently, under such circumstances, the valves will be closed and remain closed until recharging. In this way, no moisture can pass from the generating tank to the interior of the carbid receptacle, even though the apparatus remain unused for a very considerable period.

In order to insure, with absolute certainty, the seating of the valves before recharging of the carbid receptacle, the closure plug 32 is held in place by a threaded rod 33 provided with a wide head or hand wheel 34 and threaded through a yoke 35 mounted to swing above the plug 32—see Fig. 8. Above this head extends the arm 36 of a rod 37 mounted to slide vertically in the bearing or guide 38 fixed to the receptacle 4. Downwardly curved fingers 39 extend laterally from the arm 36 and lie directly over the head 34 and beneath the off set arm 25—between the off set arm 25 and head 34. Consequently, whenever the head 34 rises, as the rod 33 is screwed upwardly to release the plug 32, said head will engage the fingers 39 and arm 36 and carry them upwardly into engagement with the off set arm 25, thus rocking the yoke 23 and freeing the arm 19, to permit the valves 30 and 31 to seat themselves and so cut off the feed of carbid during recharging of the receptacle.

In order to avoid excessive pressure in the upper part of the generating tank 1, a safety tube 40 has been provided. This tube extends downwardly through the top of tank 1 and its lower end projects below the normal water line in the tank. The upper end of the tube communicates with an escape flue 41, and thence by a suitable vent pipe before mentioned to the outside of the building in which the generator is placed. Consequently, when the gas pressure in the generator tank exceeds a predetermined point, water will be forced upwardly through a tubular hollow agitator rod 43 and its casing 44 to a sufficient extent to uncover the lower end of tube 40 and thereby permit escape of the excess gas, without causing siphoning of the water in the gas tank, as heretofore.

It is essential, of course, to provide means for the escape of the air and gas mixture from the generating tank during recharging, and during the emptying of the generating tank—this operation is more commonly known as venting the generating tank. For this purpose, a by-pass 45 is provided. One end of this by-pass communicates with the upper end of the escape flue 41 while the opposite end projects downwardly through the top of the generator tank. At a point just above its passage through the top of the generator tank, the by-pass communicates with the elbow pipe 5. At a point just above this connection, the by-pass is provided with a turn plug or valve 46 adapted to control passage of fluid therethrough. When the turn plug or valve 46 is open, the fluid will pass through the by-pass and escape into the flue 41 and thence to the outer air. When closed, the gas generated in the generating tank will pass, by way of elbow pipe 5, into the gas tank. To effect opening of this plug or valve, during charging of the carbid receptacle, the plug is provided with an operating handle 47 which is flexibly connected, by link or like device 48, to the lower end of the sliding rod 37. The result is, that whenever the rod 37 is raised for recharging, the valve 46 will be opened and the chamber 1 will be vented. On the other hand, the rotary drain plug 49 is provided with a handle 50 which is connected by a rod 51 with the handle 47. The connection between the rod 51 and handle 47 is pivotal. Thus, either raising of rod 37 to recharge the carbid holder, or opening of the drain plug, will effect opening of the by-pass valve or turn plug 46, and automatic venting of the generating chamber.

In the preferred form of the invention, the rod is provided with an upper section 102 of squared or similar cross section, and adapted to slide vertically through correspondingly shaped openings in the guide brackets secured to the side of the carbid chamber. This arrangement prevents turning of the rod 37 as long as the squared section is in the guide openings of the brackets. The lower portion of the rod, however, is cylindrical. Consequently, when the rod is raised so that this rounded portion is in the opening of the brackets, it is possible to rotate the rod about its longitudinal axis. The link 48, however, can not be swung with the rod 37. Consequently, a swivel connection is provided. This comprises a small stirrup 100 swiveled to the lower end of rod 37, and a pivot bolt 101 or the like passed through the sides of the stirrup and through the upper end of the rod 48. Thus, the arm 36 with its fingers 39 may be readily swung out of the way while recharging. At the same time, of course, the drain plug 49 will, necessarily, be opened. Furthermore, the lower end of the squared section of the rod 37 will rest on the upper face of the top bracket and maintain the drain plug 49 in open position, until the rod is again turned back and lowered.

In order to prevent the arm 36 passing above the off set arm 25 instead of beneath it, when the arm 36 is returned to operative position, a guard finger 103 has been formed on the end of the off set arm 25. This finger is arranged to intercept the arm 36 when rotated in a plane above the off set arm 25.

One particular advantage of having the agitator 43 made as a hollow tube is that it may be used for filling the tank 1 with water.

In order to determine when the water in the tank has reached its proper level, a gage cock 54 is provided. This gage cock is extended through the wall of tank 1 and the wall of the agitator casing and communicates with the interior of the casing.

If desired, an outlet or escape may be provided whereby accumulated air, gas, or mixture of the same, may pass out from the lower compartment of the gas tank 8.

One particular advantage of the cap 14 and its connected parts is the ease and quickness with which it may be removed for inspection.

Another important feature is the placing of all operating parts on the exterior of the apparatus where they are easily accessible and where they may be quickly renewed, or repaired, when desired.

It is thought that the operation and use of the invention will be clear from the preceding detailed description.

Changes may be made in the construction, arrangement, and disposition of the several parts of the invention without in any way departing from the field and scope of the same and it is meant to include all such within this application wherein only a preferred form has been disclosed.

Having thus fully described our invention, what we claim as new and desire to secure by Letters Patent is:

1. In combination with an acetylene gas generator comprising a carbid receptacle, a cap for said receptacle, a flanged ring having an outer annular flange for supporting said cap and also an inner annular flange, a guard tube having at its upper end an exterior annular flange for suspending said tube detachably within the said carbid receptacle, a valve for cutting off the outflow of carbid from the latter, means arranged within said guard tube for suspending said valve and devices for raising said means within said guard tube and permitting it to descend within the same for the purpose set forth, substantially as set forth.

2. In combination with an acetylene gas generator comprising a carbid receptacle, a flanged ring resting on the top of said receptacle, a cap resting on said flanged ring, means for detachably fastening said cap and ring together, and a rockshaft journaled in said cap, whereby the removal of said cap will remove the rock-shaft also, without disturbing the ring or any other part.

3. In combination with an acetylene gas generator comprising a carbid receptacle, a cap for said receptacle having at its base an exterior annular flange, a depending tube having at its upper end an exterior annular flange, a flanged ring supported by said receptacle and having two flanges, one being for the first mentioned flange to rest on in supporting the cap, the other for the second flange to rest on in supporting the tube, means for detachably fastening together the contiguous flanges of the cap and ring and a rock-shaft journaled in said cap and removable therewith, leaving the said ring, receptacle and tube all undisturbed.

4. In combination with a generator of the character described, a cap, a rock-shaft journaled therein, a flanged ring supporting said cap, a guard tube supported by said ring, a valve in said guard tube, connections between said valve and said rock-shaft and means for operating said rock-shaft.

In witness whereof we have hereunto set our hands in the presence of two witnesses.

JOHN KILBURN.
JOHN WESLEY FAIRLEY.
THOMAS BESSELL KIDNER.
WILLIAM HERBERT IRVINE.
WILLIAM TURNBULL CHESTNUT.

Witnesses:
  JAMES C. AMBETER,
  GEORGE MASSEY.

---

Copies of this patent may be obtained for five cents each, by addressing the "Commissioner of Patents, Washington, D. C."